United States Patent
Fukushima

(10) Patent No.: US 11,149,178 B2
(45) Date of Patent: Oct. 19, 2021

(54) AZEOTROPIC OR AZEOTROPE-LIKE COMPOSITION, WORKING FLUID FOR HEAT CYCLE, AND HEAT CYCLE SYSTEM

(71) Applicant: AGC Inc., Chiyoda-ku (JP)

(72) Inventor: Masato Fukushima, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/747,606

(22) Filed: Jan. 21, 2020

(65) Prior Publication Data

US 2020/0148930 A1 May 14, 2020

Related U.S. Application Data

(63) Continuation of application No. PCT/JP2018/027907, filed on Jul. 25, 2018.

(30) Foreign Application Priority Data

Jul. 26, 2017 (JP) .................................. 2017-144773

(51) Int. Cl.
C09K 5/04 (2006.01)

(52) U.S. Cl.
CPC ........ *C09K 5/045* (2013.01); *C09K 2205/126* (2013.01)

(58) Field of Classification Search
CPC ..... C09K 5/045; C09K 2205/126; C09K 5/04
USPC ..................... 252/67, 68, 69; 60/721; 62/467
See application file for complete search history.

(56) References Cited

U.S. PATENT DOCUMENTS

| | | | | |
|---|---|---|---|---|
| 9,085,721 B2 * | 7/2015 | Robin | ........................ | C09K 3/00 |
| 10,029,961 B2 * | 7/2018 | Deur-Bert | ................. | B01D 3/36 |
| 10,077,221 B2 * | 9/2018 | Bonnet | ..................... | C07C 21/18 |
| 10,138,403 B2 * | 11/2018 | Tasaka | ................... | C10M 107/24 |
| 10,253,231 B2 * | 4/2019 | Tsuchiya | ................. | C09K 5/044 |
| 2014/0077122 A1 * | 3/2014 | Fukushima | ........... | F25B 31/002 252/67 |
| 2016/0023176 A1 * | 1/2016 | Bonnet | ..................... | C09K 3/00 51/307 |
| 2016/0023974 A1 * | 1/2016 | Bonnet | ..................... | C07C 21/18 252/182.12 |
| 2018/0044567 A1 | 2/2018 | Tasaka et al. | | |
| 2018/0066170 A1 | 3/2018 | Tasaka et al. | | |
| 2018/0371958 A1 * | 12/2018 | Fukushima | ............. | F25B 1/053 |
| 2020/0124326 A1 * | 4/2020 | Kumakura | ............... | F25B 41/00 |
| 2020/0230454 A1 * | 7/2020 | Robin | ................... | A62D 1/0071 |
| 2020/0377775 A1 * | 12/2020 | Toyooka | ................... | C09K 5/04 |

FOREIGN PATENT DOCUMENTS

| WO | WO 2010/077898 A2 | 7/2010 |
|---|---|---|
| WO | WO 2016-171256 A1 | 10/2016 |
| WO | WO 2016/171264 A1 | 10/2016 |

OTHER PUBLICATIONS

STN CAS No. 3110-38-1, Nov. 16, 1984. (Year: 1984).*
STN CAS. No. 102687-65-0, Jun. 14, 1986. (Year: 1986).*
International Search Report dated Oct. 2, 2018 in PCT/JP2018/027907 filed Jul. 25, 2018, citing documents AP-AQ therein, 2 pages.

* cited by examiner

*Primary Examiner* — Douglas J Mc Ginty
(74) *Attorney, Agent, or Firm* — Oblon, McClelland, Maier & Neustadt, L.L.P.

(57) ABSTRACT

To provide an azeotrope-like composition which provides a working fluid for heat cycle with a small composition change, with a small temperature glide and with excellent cycle performance, and a working fluid for heat cycle employing the azeotrope-like composition, and a heat cycle system. An azeotropic or azeotrope-like composition consisting of 1-chloro-2,3,3,3-tetrafluoropropene and (E)-1-chloro-3,3,3-trifluoropropene, and a working fluid for heat cycle comprising it.

9 Claims, 2 Drawing Sheets

AZEOTROPIC OR AZEOTROPE-LIKE COMPOSITION, WORKING FLUID FOR HEAT CYCLE, AND HEAT CYCLE SYSTEM

TECHNICAL FIELD

The present invention relates to an azeotropic or azeotrope-like composition consisting of 1-chloro-2,3,3,3-tetrafluoropropene (HCFO-1224yd) and (E)-1-chloro-3,3,3-trifluoropropene (HCFO1233zd(E)), a working fluid for heat cycle employing the composition, and a heat cycle system.

BACKGROUND ART

Heretofore, as a working fluid for a heat cycle system such as a refrigerant for a refrigerator, a refrigerant for an air-conditioning apparatus, a working fluid for power generation system (such as exhaust heat recovery power generation), a working fluid for a latent heat transport apparatus (such as a heat pipe) or a secondary cooling fluid, a chlorofluorocarbon (CFC) such as chlorotrifluoromethane or dichlorodifluoromethane or a hydrochlorofluorocarbon (HCFC) such as chlorodifluoromethane has been used. However, influences of CFCs and HCFCs over the ozone layer in the stratosphere have been pointed out, and their use is regulated at present.

Under the above conditions, as a working fluid for heat cycle, a hydrofluorocarbon (HFC) which has less influence over the ozone layer has been used, instead of CFCs and HCFCs. However, it is pointed out that HFCs may cause global warming.

Thus, in recent years, a hydrofluoroolefin (HFO), a hydrochlorofluoroolefin (HCFO) and a chlorofluoroolefin (CFO) are expected, which are working fluids having less influence over the ozone layer and having less influence over global warming, specifically, having low global warming potential (GWP), since they have a carbon-carbon double bond and the carbon-carbon double bond is likely to be decomposed by OH radicals in the air. In this specification, a saturated HFC will be referred to as a HFC and distinguished from a HFO unless otherwise specified. Further, a HFC may be referred to as a saturated hydrofluorocarbon in some cases.

For example, in a centrifugal refrigerator to be used for heating and cooling in buildings, industrial cold water production plants, etc., as the working fluid used, trichlorofluoromethane (CFC-11) is replaced by a HCF such as 1,1,1,2-tetrafluoroethane (HFC-134a) or 1,1,1,3,3-pentafluoropropane (HFC-245fa) and is further replaced by HCFO-1233zd(E) or the like (for example, Patent Document 1).

Further, attempts are made to further improve the performance and the like by using a plurality of compounds in combination as the working fluid. HCFO-1233zd(E) is also required to have further improved performance by using it with other compound in combination while keeping its GWP to a low level.

On the other hand, in a case where a composition comprising a plurality of compounds is a non-azeotropic composition and is used as a working fluid, when the working fluid is transferred into a refrigerator or an air-conditioning apparatus as a heat cycle system apparatus from a pressure container in which the working fluid is contained for storage or for transport, or when it leaks out from a refrigerator or an air-conditioning apparatus, it may undergo a composition change. Further, if the composition of the working fluid has changed, it is difficult to recover the working fluid to the initial composition. Accordingly, when the non-azeotropic composition is used as a working fluid, the working fluid is hardly controllable. Further, when a non-azeotropic composition is used as the working fluid, the temperature glide tends to be large.

PRIOR ART DOCUMENTS

Patent Documents

Patent Document 1: WO2010/077898

DISCLOSURE OF INVENTION

Technical Problem

It is an object of the present invention to provide an azeotropic or azeotrope-like composition which provides a working fluid for heat cycle with a small composition change and a small temperature glide since the compound is azeotropic or azeotrope-like and with a light environmental burden and excellent cycle performance, a working fluid for heat cycle employing the composition, and a heat cycle system.

Solution to Problem

In this specification, abbreviated names of halogenated hydrocarbon compounds are described in brackets after the compound names, and the abbreviated names are employed instead of the compound names as the case requires. Further, as abbreviated names, only numerals and small alphabet letters after a hyphen may be used.

The present invention provides an azeotropic or azeotrope-like composition, a working fluid for heat cycle and a heat cycle system having the following constitutions.

[1] An azeotropic or azeotrope-like composition consisting of 1-chloro-2,3,3,3-tetrafluoropropene (HCFO-1224yd, also called 1224yd) and (E)-1-chloro-3,3,3-trifluoropropene (HCFO-1233zd(E), also called 1233zd(E)).

[2] The azeotropic or azeotrope-like composition according to [1], wherein the content ratio of 1224yd to 1233zd(E) is from 1:99 to 99:1 by the mass ratio represented by 1224yd:1233zd(E).

[3] The azeotropic composition according to [1] or [2], wherein the content ratio of 1224yd to 1233zd(E) is 85:15 by the mass ratio represented by 1224yd:1233zd(E).

[4] The azeotropic or azeotrope-like composition according to any one of [1] to [3], wherein the content of 1224yd in the azeotropic or azeotrope-like composition is at least 40 mass % to the entire amount of the azeotropic or azeotrope-like composition.

[5] A working fluid for heat cycle, comprising the azeotropic or azeotrope-like composition as defined in any one of [1] to [4].

[6] The working fluid for heat cycle according to [5], wherein the proportion of the azeotropic or azeotrope-like composition to the entire amount of the working fluid for heat cycle is at least 80 mass %.

[7] The working fluid for heat cycle according to [5] or [6], wherein the content of 1224yd to the entire amount of the working fluid for heat cycle is at least 40 mass %.

[8] A heat cycle system, employing the working fluid for heat cycle as defined in any one of [5] to [7].

[9] The heat cycle system according to [8], which is a refrigerating apparatus, an air-conditioning apparatus, a power generation system, a heat transport apparatus or a secondary cooling machine.

[10] The heat cycle system according to [8] or [9], which is a centrifugal refrigerator.
[11] The heat cycle system according to [8] or [9], which is a low pressure centrifugal refrigerator.

Advantageous Effects of Invention

According to the present invention, it is possible to provide an azeotropic or azeotrope-like composition which provides a working fluid for heat cycle with a small composition change and a small temperature glide since the composition is azeotropic or azeotrope-like and with a light environmental burden and excellent cycle performance, and a working fluid for heat cycle employing the composition. Further, according to the present invention, it is possible to provide a heat cycle system with a light environmental burden and excellent cycle performance.

DESCRIPTION OF EMBODIMENTS

Figure 1:
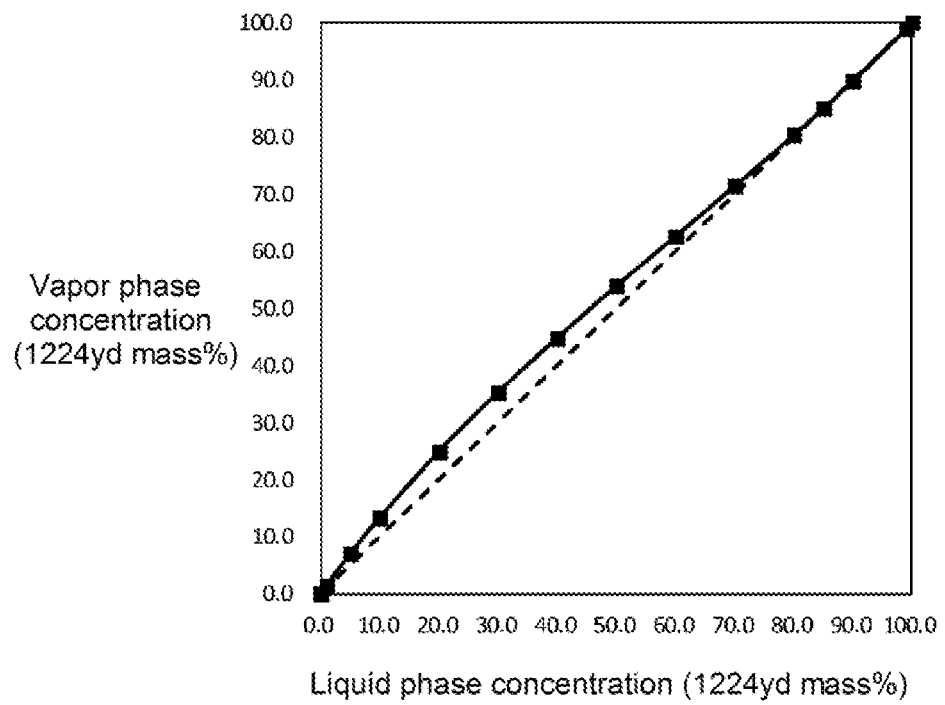
FIG. 1 is a diagram illustrating a vapor-liquid equilibrium of a composition consisting of 1224yd and 1233zd(E).

Now, the present invention will be described in detail below.
[Azeotropic or Azeotrope-Like Composition Consisting of 1224yd and 1233zd(E)]
The azeotropic or azeotrope-like composition of the present invention consists of 1224yd and 1233zd(E).
1224yd has two geometrical isomers of E-isomer (1224yd (E)) and Z-isomer (1224yd(Z)). In this specification, 1224yd not denoted by (E) or (Z) means 1224yd(E), 1224yd(Z) or a mixture of 1224yd(E) and 1224yd(Z) in an optional proportion. The same applies to other compound which has a double bond in its molecule and of which E- and Z-geometrical isomers are present.
That is, 1224yd in the azeotropic or azeotrope-like composition of the present invention forms an azeotropic or azeotrope-like composition having the after-described composition together with 1233zd(E) in any cases of 1224yd(E) isomer, 1224yd(Z) isomer or a mixture of 1224yd(E) and 1224yd(Z) in an optional proportion.
With respect to the boiling point of 1224yd and 1233zd(E) as a value measured under a pressure of $1.013 \times 10^5$ Pa, 1224yd(Z) has a boiling point of 15.0° C., 1224yd(E) 19.0° C., and 1233zd(E) 19.0° C.
An azeotropic composition is a composition in a vapor-liquid equilibrium state of a mixed liquid of at least two components, in which the compositions of the vapor phase and the liquid phase are the same, and an azeotrope-like composition is a composition which exhibits behavior substantially the same as the above behavior of an azeotropic composition in a vapor-liquid equilibrium state. Since an azeotrope-like composition can be handled in the same manner as an azeotropic composition, in this specification, an azeotrope-like composition include an azeotropic composition.
(Azeotropic Composition)
The azeotropic composition consisting of 1224yd and 1233zd(E) is a composition having a mass ratio represented by 1224yd:1233zd(E) of 85:15, and has a relative volatility (1224yd/1233zd(E)) represented by the following formula of 1.00.
(Formula to Determine Relative Volatility)
Relative volatility (1224yd/1233zd(E))=(mass % of 1224yd in a vapor phase portion/mass % of 1233zd(E) in a vapor phase portion)/(mass % of 1224yd in a liquid phase portion/mass % of 1233zd(E) in a liquid phase portion)
The above relative volatility may be obtained by measuring the compositions of the vapor phase and the liquid phase of the mixture of 1224yd and 1233zd(E) in a vapor-liquid equilibrium state.
(Test to Determine Azeotropic Composition)
The relative volatility is obtained, specifically, by the following method. 1224yd and 1233zd(E) in a predetermined composition were put in a pressure vessel at 25° C., followed by stirring, and they were left at rest until a vapor-liquid equilibrium state was achieved. Then, the vapor phase and the liquid phase in the pressure vessel were collected, and their compositions were analyzed by gas chromatography. Further, from their composition ratio, the relative volatility was determined in accordance with the above-described formula to determine the relative volatility. The results are shown in Table 1.

TABLE 1

| Liquid phase concentration [mass %] | | Vapor phase concentration [mass %] | | Relative volatility |
|---|---|---|---|---|
| 1224yd | 1233zd(E) | 1224yd | 1233zd(E) | (1224yd/1233zd(E)) |
| 0.0 | 100.0 | 0.0 | 100.0 | — |
| 1.0 | 99.0 | 1.4 | 98.6 | 1.4057 |
| 5.0 | 95.0 | 7.0 | 93.0 | 1.4301 |
| 10.0 | 90.0 | 13.3 | 86.7 | 1.3806 |
| 20.0 | 80.0 | 24.9 | 75.1 | 1.3262 |
| 30.0 | 70.0 | 35.3 | 64.7 | 1.2731 |
| 40.0 | 60.0 | 44.8 | 55.2 | 1.2174 |
| 50.0 | 50.0 | 53.9 | 46.1 | 1.1692 |
| 60.0 | 40.0 | 62.6 | 37.4 | 1.1159 |
| 70.0 | 30.0 | 71.4 | 28.6 | 1.0699 |
| 80.0 | 20.0 | 80.3 | 19.7 | 1.0190 |
| 85.0 | 15.0 | 85.0 | 15.0 | 1.0000 |
| 90.0 | 10.0 | 89.8 | 10.2 | 0.9782 |
| 99.0 | 1.0 | 98.9 | 1.1 | 0.9082 |
| 100.0 | 0.0 | 100.0 | 0.0 | — |

Further, based on the results in Table 1, the vapor-liquid equilibrium graph of a composition consisting of 1224yd and 1233zd(E) was prepared, which is shown in FIG. 1. FIG. 1 is a graph illustrating the relation between the liquid phase concentration (mass %) and the vapor phase concentration (mass %) of 1224yd in a vapor-liquid equilibrium state of mixtures of 1224yd and 1233zd(E) with various compositions. In FIG. 1, the solid line indicates the relation between the liquid phase concentration (mass %) and the vapor phase concentration (mass %) of 1224yd measured above, and the broken line represents a straight line with a relative volatility of 1.00 at which the compositions in the vapor phase and in the liquid phase agree with each other. In FIG. 1, the intersection point of the curve represent by the solid line and the straight line represented by the broken line indicates the azeotropic composition of 1224yd: 1233zd(E)=85.0 mass %:15.0 mass %.
(Azeotrope-Like Composition)
Further, it is found from FIG. 1 that of the mixture of 1224yd and 1233zd(E), the relation between the liquid phase concentration (mass %) and the vapor phase concentration (mass %) in a vapor-liquid equilibrium state approximates to the straight line with a relative volatility of 1.00 represented by the broken line within a range of 1224yd of from 1 to 99 mass %. In this specification, an azeotrope-like composition means a composition having a relative volatility determined in accordance with the above formula within a range of 1.00±0.45.

According to the above measurement results, the azeotrope-like composition consisting of 1224yd and 1233zd(E) has a relative volatility within a range of 1.00±0.45 with a mass ratio of 1224yd to 1233zd(E) (1224yd [mass %]/1233zd(E) [mass %]) of from 1/99 to 99/1.

Further, as described hereinafter, the temperature glide is an index which reflects the azeotrope-like composition, and a mixture having a temperature glide of at most 0.8° C. may be considered to have an azeotrope-like composition.

From the above results, an azeotropic or azeotrope-like composition consisting of 1224yd and 1233zd(E) in the present invention is a mixture having a mas ratio of 1224yd to 1233zd(E) (1224yd [mass %]:1233zd(E) [mass %]) of from 1:99 to 99:1.

1224yd(Z) and 1224yd(E) may be used without being distinguished when constituting an azeotrope-like composition as described above. However, in view of chemical stability, 1224yd(Z) is preferred to 1224yd(E). Accordingly, in the azeotrope-like composition of the present invention, the content ratio of 1224yd(Z) to the entire amount of 1224yd is preferably from 30 to 100 mass %, more preferably from 50 to 100 mass %. 1224yd in the azeotrope-like composition of the present invention particularly preferably consists solely of 1224yd(Z). However, with a view to suppressing an increase of production cost required for e.g. separation by distillation of Z-isomer and E-isomer of HCFO-1224yd, HCFO-1224yd(E) may be contained in an amount of at most 5 mass % per 100 mass % of the total amount of HCFO-1224yd(Z) and HCFO-1224yd(E).

When the azeotrope-like composition consisting of 1224yd and 1233zd(E) has a content ratio of 1224yd to 1233zd(E) within the above range, it is excellent in the stability of the composition with a very small difference in the composition ratio between the vapor phase and the liquid phase.

Both 1224yd and 1233zd(E) has GWP of 1. GWP of a mixture is represented by a weighted average by the composition mass, and accordingly GWP of the azeotrope-like composition of the present invention is 1. GWP being 1 is remarkably lower than GWP of HFC-245fa of 1,030, which has been used as a working fluid for a centrifugal refrigerator. GWP is a global warming potential (100 years) disclosed in, or in accordance with, Intergovernmental Panel on Climate Change (IPCC), fifth assessment report (2014). In this specification, GWP is represented by this value unless otherwise specified.

In Table 2 is shown thermal stability of 1224yd(Z) and 1233zd(E). Thermal stability is represented by an amount of generation of an acid content (amount of an acid content generated relative to the amount of specimen before heating, mass ppm) measured by neutralization titration method. Thermal stability of 1224yd(Z) may be considered to indicate thermal stability of 1224yd. Whereas 1233zd(E) is advantageous in that it has a higher coefficient of performance as compared with 1224yd in terms of cycle performance as a working fluid as described hereinafter.

TABLE 2

| Compound | temperature | | | |
|---|---|---|---|---|
| | 125° C. | 150° C. | 175° C. | 200° C. |
| 1224yd(Z) | 0.0 | 0.0 | 0.3 | 22 |
| 1233zd(E) | 0.0 | 0.2 | 11 | 132 |

The composition of the azeotrope-like composition of the present invention may be properly adjusted within the above range of the azeotrope-like composition, as the case requires, considering the properties of 1224yd and 1233zd (E). For example, in a case where the azeotrope-like composition of the present invention is required to have a composition with a relative volatility further closer to 1.00, the content of 1224yd is preferably at least 40 mass % to the entire amount of the azeotrope-like composition. That is, preferred is a composition with a mass ratio of 1224yd to 1233zd(E) within a range of from 40:60 to 99:1. In a case where it is required that the relative volatility is further closer to 1.00 and there is substantially no difference in the composition ratio between the vapor and liquid phases, an azeotrope-like composition consisting of 1224yd and 1233zd(E) more preferably has a mass ratio of 1224yd to 1233zd(E) within a range of from 60:40 to 99:1, further preferably from 70:30 to 95:5.

The azeotrope-like composition of the present invention has a very small difference in the composition ratio between the vapor and liquid phases and is thereby suitable for a working fluid for heat cycle. That is, by using the azeotrope-like composition of the present invention, it is possible to obtain a working fluid for heat cycle (hereinafter sometimes referred to simply as "working fluid") excellent in the stability of the composition.

[Working Fluid for Heat Cycle]

The working fluid for heat cycle of the present invention comprises the above azeotrope-like composition consisting of 1224yd and 1233zd(E). Further, the working fluid for heat cycle of the present invention may optionally contain, within a range not to impair the effects of the present invention, in addition to the above azeotrope-like composition, a compound commonly used as a working fluid.

When the working fluid of the present invention, which comprises the azeotrope-like composition of the present invention, is employed for a heat cycle system, the composition change at the time of filling or at the time of leakage from an apparatus is very small. Therefore, a very stable cycle performance of a heat cycle system is achieved. Further, it is easy to control the working fluid for heat cycle, the efficiency can be more increased while a certain capacity is maintained, whereby favorable cycle performance will be obtained.

The working fluid of the present invention comprises the azeotrope-like composition consisting of 1224yd and 1233zd(E) and has a temperature glide close to 0. Accordingly, as described hereinafter, a heat cycle system with a favorable energy efficiency can be obtained.

The "temperature glide" is one of indices to properties when a mixture is used as a working fluid. The temperature glide is defined as properties such that the initiation temperature and the completion temperature of evaporation in an evaporator or of condensation in a condenser, for example, as the heat exchanger, differ from each other.

The influence of the temperature glide in a heat cycle system when the azeotrope-like composition is employed as a working fluid will be described with reference to a case where the azeotrope-like composition is employed for a heat cycle system shown in FIG. 2.

Figure 2:
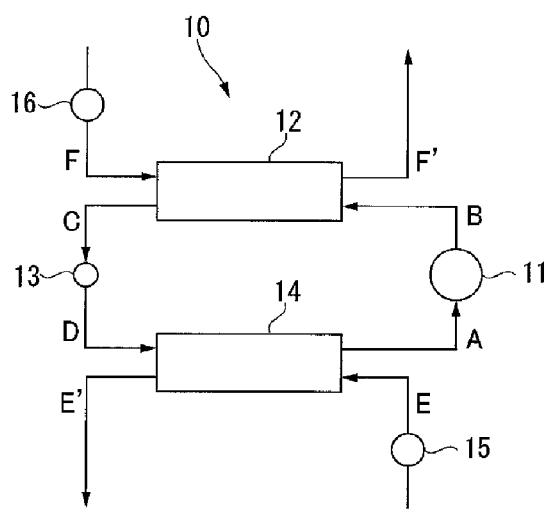
FIG. 2 is a schematic construction view illustrating an example of a refrigerating cycle system.

FIG. 2 is a schematic construction view illustrating an example of a refrigerating cycle system to which the working fluid of the present invention is employed, as described hereinafter. A refrigerating cycle system 10 is a system schematically comprising a compressor 11 to compress a working fluid vapor A to form a high temperature/high pressure working fluid vapor B, a condenser 12 to cool and liquefy the working fluid vapor B discharged from the compressor 11 to form a low temperature/high pressure working fluid C, an expansion valve 13 to let the working fluid C discharged from the condenser 12 expand to form a low temperature/low pressure working fluid D, an evaporator 14 to heat the working fluid D discharged from the expansion valve 13 to form a high temperature/low pressure working fluid vapor A, a pump 15 to supply a load fluid E to the evaporator 14, and a pump 16 to supply a fluid F to the condenser 12.

In the refrigerating cycle system 10, the temperature of the working fluid increases from an inlet toward an outlet of the evaporator 14 at the time of evaporation, and on the contrary, the temperature decreases from an inlet toward an outlet of the condenser 12 at the time of condensation. In the refrigerating cycle system 10, in the evaporator 14 and the condenser 12, such is achieved by heat exchange between the working fluid and a heat source fluid such as water or the air flowing to face the working fluid. The heat source fluid is represented, in the refrigerating cycle system 10, by "E→E'" in the evaporator 14 and by "F→F'" in the condenser 12.

Here, when a working fluid having a single composition, which has no temperature glide, is employed, the temperature difference between the outlet temperature and the inlet temperature of the evaporator 14 is substantially constant.

Further, since the azeotropic composition undergoes substantially no composition change when evaporated and condensed repeatedly, it can be treated substantially the same as a working fluid having a single composition, when used as a working fluid. Further, the azeotrope-like composition undergoes a small change of composition when evaporated and condensed repeatedly and can be treated the same as the azeotropic composition. Accordingly, even when the azeotropic composition or the azeotrope-like composition is used as a working fluid, the temperature difference between the outlet temperature and the inlet temperature of the evaporator 14 is substantially constant.

Whereas, when a non-azeotropic composition is used, the temperature difference will not be constant. For example, when the non-azeotropic composition is to be evaporated at 0° C. in the evaporator 14, the inlet temperature is lower than 0° C., and frosting is likely to occur in the evaporator 14. Particularly when the temperature glide is larger, the inlet temperature is lower and frosting is more likely to occur.

Further, for example, as shown in the above refrigerating cycle system 10, usually, in a heat cycle system, the heat exchange efficiency is to be improved by making the working fluid and the heat source fluid such as water or the air flowing in heat exchangers such as the evaporator 14 or the condenser 12 flow in counter-current flow. Here, except for at startup, the temperature difference of the heat source fluid is usually small in a stable operation state during long term operation. Accordingly, with a non-azeotropic composition which has significantly different compositions in a vapor phase and in a liquid phase, since its temperature glide is large, it is difficult to obtain a heat cycle system with a good energy efficiency. Whereas, in a case where an azeotropic composition is used as a working fluid, it is possible to obtain a heat cycle system with a good energy efficiency.

Further, in a case where a non-azeotropic composition of which the compositions in a vapor phase and in a liquid phase are very different from each other is used for the refrigerating cycle system 10, if the non-azeotropic composition circulating in the system 10 leaks out, the composition of the non-azeotropic composition circulating in the system 10 may significantly change as between before and after the leakage.

The working fluid of the present invention, which comprises an azeotrope-like composition consisting of 1224yd and 1233zd(E), has a temperature glide close to 0, and is free from the above problems of non-azeotropic compositions.

Since 1224yd and 1233zd(E) are both non-flammable, the azeotrope-like composition of the present invention has no combustibility. Accordingly, a working fluid for heat cycle comprising the azeotrope-like composition has very high safety even when it leaks out of the heat cycle system.

When the azeotrope-like composition of the present invention is used as a working fluid, considering properties of 1224yd and 1233zd(E), the composition can be properly adjusted within a range of the azeotrope-like composition. In Table 3 are shown the coefficient of performance and the refrigerating capacity as the cycle performance of 1224yd (Z) and 1233zd(E) as a working fluid. The coefficient of performance and the refrigerating capacity are determined by the after-described methods (evaporation temperature: 5° C., condensation completion temperature: 40° C., supercooling degree (SC); 5° C., degree of superheat (SH): 0° C., compressor efficiency: 0.8). The coefficient of performance and the refrigerating capacity of each compound are represented by relative values on the basis of 1233zd(E) (1.00) (hereinafter referred to as "relative coefficient of performance" and "relative refrigerating capacity", respectively).

TABLE 3

| Compound | HCFO-1233zd(E) | HCFO-1224yd(Z) |
|---|---|---|
| Relative refrigerating capacity | 1.00 | 1.13 |
| Relative coefficient of performance | 1.00 | 0.99 |

It is apparent from Table 3 that 1224yd(Z) is superior in the relative refrigerating capacity to 1233zd(E) and 1233zd (E) is slightly superior in the relative coefficient of performance to 1224yd(Z). Further, the cycle performance of 1224yd(Z) may be considered to represent the cycle performance of 1224yd. When the azeotrope-like composition of the present invention is used as a working fluid, considering such properties of 1224yd and 1233zd(E), the composition is properly adjusted within the range of the azeotrope-like composition. For example, in a case where the azeotrope-like composition of the present invention is used as a working fluid, the mass ratio of 1224yd to 1233zd(E) is preferably from 40:60 to 99:1, more preferably from 60:40 to 99:1, further preferably from 70:30 to 95:5.

The content of the azeotrope-like composition of the present invention in the working fluid of the present invention is preferably at least 80 mass %, particularly preferably 100 mass % in the working fluid (100 mass %). If the content of the azeotrope-like composition is less than 80 mass %, effects according to the azeotrope-like composition of the present invention, particularly low GWP and a temperature glide being close to 0, may not be achieved. As described above, if the temperature glide is large, in a case where the working fluid comprising such an azeotrope-like composition leaks out from a heat cycle apparatus, the controllability of the working fluid may be decreased, such that the composition change of the working fluid is large.

The content of 1224yd in the working fluid of the present invention is, in the working fluid (100 mass %), preferably at least 40 mass %, and with a view to decreasing the temperature glide, more preferably at least 60 mass %, further preferably from 70 to 95 mass %. By the content of 1224yd being within the above range, the refrigerating capacity will be improved while advantages of the azeotrope-like composition of the present invention are made use of.

(Optional Component)

The working fluid for heat cycle of the present invention may optionally contain a compound commonly used as a working fluid, in addition to the azeotrope-like composition, within a range not to impair the effects of the present invention.

Such an optional compound (optional component) may, for example, be a HFC, a HFO, a HCFO other than 1224yd and 1233zd(E), a hydrocarbon, carbon dioxide, and other component which vaporize or liquefy together with 1224yd and 1233zd(E). The optional component is preferably a HFC, a HFO or a HCFO other than 1224yd and 1233zd(E).

As the optional component, preferred is a compound which, when used for heat cycle with 1224yd and 1233zd(E) in combination, improves the cycle performance and keeps the temperature glide within an acceptable range while keeping GWP to be low. When a working fluid for heat cycle contains such a compound in combination with 1224yd and 1233zd(E), more favorable cycle performance will be obtained while suppressing GWP to be low, and the influence by the temperature glide is also little.

In the working fluid of the present invention, the content of the optional component is the total content and is the content excluding the content of the azeotrope-like composition from the entire amount of the working fluid.

(HFC)

A HFC as an optional component is selected preferably from the above viewpoint. The HFC is known to have a higher GWP as compared with 1224yd and 1233ze(E). Accordingly, the HFC to be used in combination with the azeotrope-like composition (GWP:1) of the present invention, is preferably selected properly particularly with a view to improving the cycle performance as the working fluid and maintaining GWP within an acceptable range, for example, less than 150.

As a HFC which has less influence over the ozone layer and which has less influence over global warming, specifically, a HFC having from 1 to 5 carbon atoms is preferred. The HFC may be linear, branched or cyclic.

The HFC may, for example, be difluoromethane, difluoroethane, trifluoroethane, tetrafluoroethane, pentafluoroethane, pentafluoropropane, hexafluoropropane, heptafluoropropane, pentafluorobutane or heptafluorocyclopentane.

Among them, more preferred as the HFC is 1,1,2,2-tetrafluoroethane (HFC-134), HFC-134a, HFC-245fa or 1,1,1,3,3-pentafluorobutane (HFC-365mfc), which has less influence over the ozone layer and which is excellent in the refrigerating cycle properties, and further preferred is HFC-134a, HFC-245fa or HFC-365mfc. The HFC may be used alone or in combination of two or more.

The content of the HFC in the working fluid (100 mass %) used in the present invention is, for example, in the case of HFC-245fa, within a range of from 1 to 20 mass %, whereby the refrigerating capacity can be improved without remarkably decreasing the coefficient of performance and remarkably increasing GWP of the working fluid. Since GWP of HFC-245fa is so high as 1,030, the content is properly adjusted considering GWP of the working fluid within the above content. Also in a case where a HFC other than HFC-245fa is used, the content may be properly controlled depending upon GWP and the cycle performance required for the working fluid.

(HFO)

A HFO is also preferably selected from the same viewpoint as the HFC. GWP of the HFO is an order of magnitude lower than the HFC. Accordingly, the HFO to be used in combination with the azeotrope-like composition of the present invention is selected preferably considering improvement of the cycle performance as the working fluid, rather than considering GWP.

The HFO may be 2,3,3,3-tetrafluoropropene (HFO-1234yf), 1,2-difluoroethylene (HFO-1132), 2-fluoropropene (HFO-1261yf), 1,1,2-trifluoropropene (HFO-1243yc), (E)-1,2,3,3,3-pentafluoropropene (HFO-1225ye(E)), (Z)-1,2,3,3,3-pentafluoropropene (HFO-1225ye(Z)), (E)-1,3,3,3-tetrafluoropropene (HFO-1234ze(E)), (Z)-1,3,3,3-tetrafluoropropene (HFO-1234ze(Z)), 3,3,3-trifluoropropene (HFO-1243zf), (E)-1,1,1,4,4,4-hexafluoro-2-butene (HFO-1336mzz(E)) or (Z)-1,1,4,4,4-hexafluoro-2-butene (HFO-1336mzz(Z)).

The HFO is preferably HFO-1234yf, HFO-1234ze(E), HFO-1234ze(Z), HFO-1336mzz(Z) or HFO-1243zf, more preferably HFO-1234yf, HFO-1234ze(E), HFO-1234ze(Z) or HFO-1336mzz(Z). The HFO may be used alone or in combination of two or more.

(HCFO Other than 1224yd and 1233zd(E))

A HCFO as an optional component other than 1224yd and 1233zd(E) is also preferably selected from the same viewpoint as the HFC. GWP of a HCFO, even other than 1224yd and 1233zd(E), is an order of magnitude lower than the HFC. Accordingly, the HCFO other than 1224yd and 1233zd(E) to be used in combination with the azeotrope-like composition of the present invention is selected preferably considering improvement of the cycle performance as the working fluid, rather than considering GWP.

The HCFO other than 1224yd and 1233zd(E) may be 1-chloro-2,2-difluoroethylene (HCFO-1122), 1,2-dichlorofluoroethylene (HCFO-1121), 1-chloro-2-fluoroethylene (HCFO-1131), 1-chloro-2,3,3-trifluoro-1-propene (HCFO-1233yd), 2-chloro-3,3,3-trifluoropropene (HCFO-1233xf) or (Z)-1-chloro-3,3,3-trifluoropropene (HCFO-1233zd(Z)). The HCFO other than 1224yd and 1233zd(E) may be used alone or in combination of two or more.

In a case where the working fluid contains a HCFO other than 1224yd and 1233zd(E), the content is preferably less than 10 mass %, more preferably at most 8 mass %, further preferably at most 5 mass % per 100 mass % of the working fluid.

(Other Optional Component)

The working fluid to be used for a heat cycle system of the present invention may contain, other than the above optional component, carbon dioxide, a hydrocarbon, a chlorofluoroolefin (CFO) or the like. Such other optional component is preferably a component which has less influence over the ozone layer and which has less influence over global warming.

The hydrocarbon may, for example, be propane, propylene, cyclopropane, butane, isobutane, pentane or isopentane. The hydrocarbon may be used alone or in combination of two or more.

In a case where the working fluid contains a hydrocarbon, its content is preferably less than 10 mass %, more preferably at most 5 mass %, further preferably at most 3 mass % per 100 mass % of the working fluid. When the working fluid contains a hydrocarbon, the solubility of a mineral lubricating oil in the working fluid will be more favorable.

The CFO may, for example, be chlorofluoropropene or chlorofluoroethylene. The CFO is preferably 1,1-dichloro-2,3,3,3-tetrafluoropropene (CFO-1214ya), 1,3-dichloro-1,2,3,3-tetrafluoropropene (CFO-1214yb) or 1,2-dichloro-1,2-difluoroethylene (CFO-1112), in that combustibility of the working fluid is easily suppressed without remarkably lowering the cycle performance of the working fluid. The CFO may be used alone or in combination of two or more.

In a case where the working fluid contains a CFO, the content is preferably less than 10 mass %, more preferably at most 8 mass %, further preferably at most 5 mass % per 100 mass % of the working fluid. By the working fluid containing a CFO, its combustibility is likely to be suppressed. When the content of the CFO is at most the upper limit value, favorable cycle performance is likely to be obtained.

In a case where the working fluid contains the above-described other optional component, the total content of such other optional component in the working fluid is preferably less than 10 mass %, more preferably at most 8 mass %, further preferably at most 5 mass % per 100 mass % of the working fluid.

<Working Fluid Composition>

When the working fluid is applied to a heat cycle system, it may be used as a working fluid composition usually as mixed with a lubricating oil. A working fluid composition may further contain a known additive such as a stabilizer or a leak detecting substance in addition to the above components.

(Lubricating Oil)

As a lubricating oil, a known lubricating oil commonly used for a working fluid composition together with a working fluid comprising a halogenated hydrocarbon may be used without any particular restriction. The lubricating oil may, for example, be specifically an oxygen-containing synthetic oil (such as an ester lubricating oil or an ether lubricating oil), a fluorinated lubricating oil, a mineral lubricating oil or a hydrocarbon synthetic oil.

As the ester lubricating oil, a dibasic acid ester oil, a polyol ester oil, a complex ester oil, a polyol carbonate ester oil or the like may be mentioned.

The ether lubricating oil may be a polyvinyl ether oil or a polyoxyalkylene oil such as a polyglycol oil.

The fluorinated lubricating oil may, for example, be a compound having hydrogen atoms of a synthetic oil (such as the after-mentioned mineral oil, a poly-α-olefin, an alkylbenzene or an alkyl naphthalene) substituted by fluorine atoms, a perfluoropolyether oil or a fluorinated silicone oil.

The mineral lubricating oil may, for example, be a paraffin mineral oil or a naphthene mineral oil obtained by purifying a lubricating oil fraction obtained by atmospheric distillation or vacuum distillation of crude oil by a purification treatment (such as solvent deasphalting, solvent extraction, hydrocracking, solvent dewaxing, catalytic dewaxing, hydrotreating or clay treatment) optionally in combination.

The hydrocarbon synthetic oil may, for example, be poly-α-olefin, an alkylbenzene or an alkylnaphthalene.

The lubricating oil may be used alone or in combination of two or more.

The lubricating oil is preferably at least one member selected from a polyol ester oil, a polyvinyl ether oil and a polyglycol oil in view of the compatibility with the working fluid.

The amount of addition of the lubricating oil is not limited within a range not to remarkably decrease the effects of the present invention and is preferably from 10 to 100 parts by mass, more preferably from 20 to 50 parts by mass per 100 parts by mass of the working fluid.

(Stabilizer)

The stabilizer is a component which improves the stability of the working fluid against heat and oxidation. The stabilizer may be any known stabilizer commonly used for a heat cycle system together with a working fluid comprising a halogenated hydrocarbon, for example, an oxidation resistance-improving agent, a heat resistance-improving agent or a metal deactivator.

The oxidation resistance-improving agent and the heat resistance-improving agent may, for example, be N,N'-diphenylphenylenediamine, p-octyldiphenylamine, p,p'-dioctyldiphenylamine, N-phenyl-1-naphthylamine, N-phenyl-2-naphthylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol or 4,4'-methylenebis(2,6-di-t-butylphenol). The oxidation resistance-improving agent and the heat resistance-improving agent may be used alone or in combination of two or more.

The metal deactivator may, for example, be imidazole, benzimidazole, 2-mercaptobenzothiazole, 2,5-dimercaptothiadiazole, salicylidene-propylenediamine, pyrazole, benzotriazole, tritriazole, 2-methylbenzimidazole, 3,5-dimethylpyrazole, methylenebis-benzotriazole, an organic acid or an ester thereof, a primary, secondary or tertiary aliphatic amine, an amine salt of an organic acid or inorganic acid, a heterocyclic nitrogen-containing compound, an amine salt of an alkyl phosphate, or a derivative thereof.

The amount of addition of the stabilizer is not limited within a range not to remarkably decrease the effects of the present invention, and is preferably at most 5 parts by mass, more preferably at most 1 part by mass per 100 parts by mass of the working fluid.

(Leak Detecting Substance)

The leak detecting substance may, for example, be an ultraviolet fluorescent dye, an odor gas or an odor masking agent.

The ultraviolet fluorescent dye may be known ultraviolet fluorescent dyes commonly used for a heat cycle system together with a working fluid comprising a halogenated hydrocarbon, such as dyes as disclosed in e.g. U.S. Pat. No. 4,249,412, JP-A-10-502737, JP-A-2007-511645, JP-A-2008-500437 and JP-A-2008-531836.

The odor masking agent may be known perfumes commonly used for a heat cycle system together with a working fluid comprising a halogenated hydrocarbon, such as perfumes as disclosed in e.g. JP-A-2008-500437 and JP-A-2008-531836.

In a case where the leak detecting substance is used, a solubilizing agent which improves the solubility of the leak detecting substance in the working fluid may be used.

The solubilizing agent may be ones as disclosed in e.g. JP-A-2007-511645, JP-A-2008-500437 and JP-A-2008-531836.

The amount of addition of the leak detecting substance may be within a range not to remarkably decrease the effects of the present invention and is preferably at most 2 parts by mass, more preferably at most 0.5 part by mass by 100 parts by mass of the working fluid.

[Heat Cycle System]

The heat cycle system of the present invention is obtained by applying the working fluid of the present invention to an equipment or apparatus for heat cycle. The working fluid may be applied as the working fluid composition to the heat cycle system. The working fluid of the present invention may be applied as it is to an equipment or apparatus for heat cycle designed so that HFC-245fa or 1233zd is applicable, to replace HFC-245fa or 1233zd, and thus is economically efficient.

As a heat cycle system, a heat cycle system comprising a heat exchanger such as a compressor, a condenser or an evaporator may be mentioned. The heat cycle system, for example, a refrigerating cycle system, has a mechanism in which a gaseous working fluid is compressed by a compressor and cooled by a condenser to form a high pressure liquid, the pressure of the liquid is lowered by an expansion valve, and the liquid is vaporized at low temperature by an evaporator so that heat is removed by the heat of vaporization.

The heat cycle system of the present invention may be a heat pump system utilizing heat obtained by a condenser or may be a refrigerating cycle system utilizing coldness obtained by an evaporator. The heat cycle system of the present invention may be a flooded evaporator type or may be a direct evaporation type. In the heat cycle system of the present invention, a substance other than the working fluid, to be heat-exchanged with the working fluid, is preferably water or air.

The heat cycle system according to the present invention may, for example, be specifically a refrigeration equipment, an air-conditioning equipment, a power generation system, a heat transfer apparatus and a secondary cooling machine. Among them, the heat cycle system according to the present invention, which stably exhibits heat cycle performance in a working environment at higher temperature, is preferably employed as an air-conditioning apparatus to be disposed outdoors in many cases. Further, the heat cycle system according to the present invention is preferably employed also for a refrigeration equipment.

The power generation system is preferably a power generation system by Rankine cycle system. The power generation system may, for example, be specifically a system wherein in an evaporator, a working fluid is heated by e.g. geothermal energy, solar heat or waste heat in a medium-to-high temperature range at a level of from 50 to 200° C., and the vaporized working fluid in a high temperature and high pressure state is adiabatically expanded by an expansion device, so that a power generator is driven by the work generated by the adiabatic expansion to carry out power generation.

Further, the heat cycle system of the present invention may be a heat transport apparatus. The heat transport apparatus is preferably a latent heat transport apparatus. The latent heat transport apparatus may be a heat pipe conducting latent heat transport utilizing evaporation, boiling, condensation, etc. of a working fluid filled in an apparatus, and a two-phase closed thermosiphon. A heat pipe is applied to a relatively small-sized cooling apparatus such as a cooling apparatus of a heating portion of a semiconductor device and electronic equipment. A two-phase closed thermosiphon is widely used for a gas/gas heat exchanger, to accelerate snow melting and to prevent freezing of roads, since it does not require a wick and its structure is simple.

The refrigeration equipment may, for example, be specifically a showcase (such as a built-in showcase or a separate showcase), a commercial refrigerator-freezer, a vending machine or an ice making machine.

The air-conditioning apparatus may, for example, be specifically a room air-conditioner, a packaged air-conditioner (such as a store packaged air-conditioner, a building packaged air-conditioner or a plant packaged air-conditioner), a heat source apparatus chilling unit, a gas engine heat pump, a train air-conditioning system or an automobile air-conditioning system.

As the heat source apparatus chilling unit, for example, a volume compression refrigerator or a centrifugal refrigerator may be mentioned. The centrifugal refrigerator described below is preferred since the working fluid filling amount is large, whereby the effects of the present invention can be more remarkably obtained.

The centrifugal refrigerator is a refrigerator which employs a centrifugal compressor. The centrifugal refrigerator is one type of a vapor compression refrigerator, and usually, also called a turbo refrigerator. The centrifugal compressor is provided with an impeller and discharges the working fluid to the periphery by the rotating impeller to conduct compression. The centrifugal refrigerator is used for heating and cooling in office buildings, district heating and cooling and in hospitals and in addition, cold water production plants in semiconductor plants and in petrochemical industry, etc.

The centrifugal refrigerator may be either low pressure type or high pressure type, and is preferably a low pressure type centrifugal refrigerator. Here, a low pressure type means a centrifugal refrigerator employing a working fluid which is not subject to High Pressure Gas Safety Act, such as CFC-11, 2,2-dichloro-1,1,1-trifluoroethane (HCFC-123) or HFC-245fa, that is, a working fluid which does not correspond to "a liquefied gas of which the gas pressure is 0.2 MPa or greater at the normal operating temperature and the gas pressure is 0.2 MPa or greater at present, or a liquefied gas of which the temperature for the gas pressure to reach 0.2 MPa is 35° C. or below".

A refrigerating cycle system as an example of a heat cycle system will be described with reference to FIG. 2. A refrigerating cycle system has a mechanism in which a gaseous working fluid is compressed by a compressor and cooled by a condenser to form a high pressure liquid, the pressure of the liquid is lowered by an expansion valve, and the liquid is vaporized at low temperature by an evaporator so that heat is removed by the heat of vaporization.

In the refrigerating cycle system 10, the following cycle is repeated.

(i) A working fluid vapor A discharged from an evaporator 14 is compressed by a compressor 11 to form a high temperature/high pressure working fluid vapor B.

(ii) The working fluid vapor B discharged from the compressor 11 is cooled and liquefied by a fluid F in a condenser 12 to form a low temperature/high pressure working fluid C. At that time, the fluid F is heated to form a fluid F', which is discharged from the condenser 12.

(iii) The working fluid C discharged from the condenser 12 is expanded in an expansion valve 13 to form a low temperature/low pressure working fluid D.

(iv) The working fluid D discharged from the expansion valve 13 is heated by a load fluid E in the evaporator 14 to form a high temperature/low pressure working fluid vapor A. At that time, the load fluid E is cooled and becomes a load fluid E', which is discharged from the evaporator 14.

Figure 3:
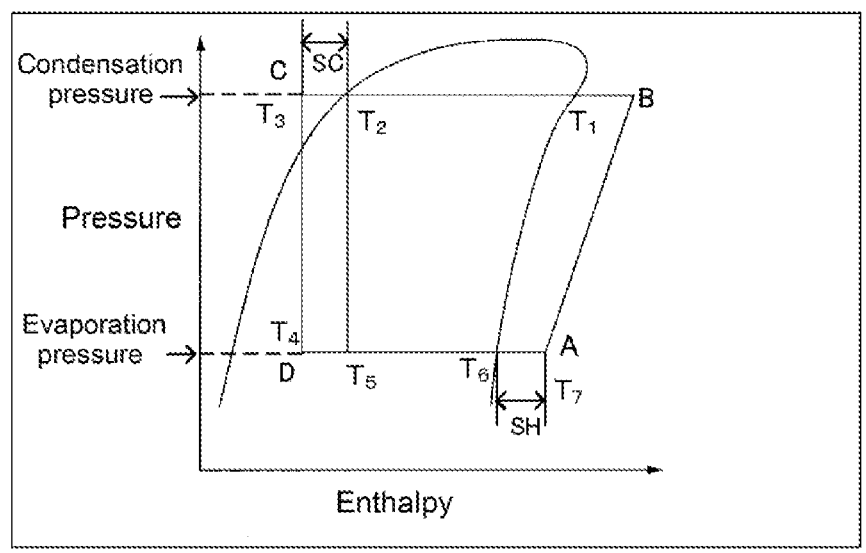
FIG. 3 is a cycle diagram illustrating the state change of a working fluid for heat cycle in the refrigerating cycle system in FIG. 2 on a pressure-enthalpy diagram.

The state change of the working fluid in the refrigerating cycle system 10 as represented on a pressure-enthalpy diagram may be represented as a trapezoid having points A, B, C and D as vertexes, as shown in FIG. 3.

The AB process is a process wherein adiabatic compression is carried out by the compressor 11 to change the high temperature/low pressure working fluid vapor A to a high temperature/high pressure working fluid vapor B, and is represented by the line AB in FIG. 3. As described hereinafter, the working fluid vapor A is introduced to the compressor 11 in a superheated state, and the obtained working fluid vapor B is also a vapor in a superheated state.

The BC process is a process wherein isobaric cooling is carried out in the condenser 12 to change the high temperature/high pressure working fluid vapor B to a low temperature/high pressure working fluid C and is represented by the BC line in FIG. 3. The pressure in this process is the condensation pressure. Of the two intersection points of the pressure-enthalpy diagram and the BC line, the intersection point $T_1$ on the high enthalpy side is the condensing temperature, and the intersection point $T_2$ on the low enthalpy side is the condensation boiling point temperature. Here, in a case where the working fluid is a composition comprising a plurality of compounds, the temperature glide is represented by the difference between $T_1$ and $T_2$.

The CD process is a process wherein isenthalpic expansion is carried out by the expansion valve 13 to change the low temperature/high pressure working fluid C to a low temperature/low pressure working fluid D and is presented by the CD line in FIG. 3. $T_2$-$T_3$ corresponds to the supercoiling degree (SC) of the working fluid in the cycle of (i) to (iv), where $T_3$ is the temperature of the low temperature/high pressure working fluid C.

The DA process is a process wherein isobaric heating is carried out in the evaporator 14 to have the low temperature/low pressure working fluid D returned to a high temperature/low pressure working fluid vapor A, and is represented by the DA line in FIG. 3. The pressure in this process is the evaporation pressure. Of the two intersection points of the pressure-enthalpy diagram and the DA line, the intersection point $T_6$ on the high enthalpy side is the evaporation temperature. $T_7$-$T_6$ corresponds to the degree of superheat (SH) of the working fluid in the cycle of (i) to (iv), where $T_7$ is the temperature of the working fluid vapor A. $T_4$ indicates the temperature of the working fluid D.

Here, cycle performance of the working fluid for heat cycle is evaluated, for example, by the refrigerating capacity (hereinafter referred to as "Q" as the case requires) and the coefficient of performance (hereinafter referred to as "COP" as the case requires) of the working fluid for heat cycle. Q and COP of the working fluid for heat cycle are obtained respectively in accordance with the following formulae (1) and (2) from enthalpies $h_A$, $h_B$, $h_C$ and $h_D$ in the respective states A (after evaporation, high temperature and low pressure), B (after compression, high temperature and high pressure), C (after condensation, low temperature and high pressure) and D (after expansion, low temperature and low pressure) of the working fluid for heat cycle.

$$Q = h_A - h_D \tag{1}$$

$$COP = Q/\text{compression work} = (h_A - h_D)/(h_B - h_A) \tag{2}$$

Q represented by ($h_A$-$h_D$) corresponds to the output (kW) of the refrigerating cycle, and the compression work represented by ($h_B$-$h_A$), for example, an electric energy required to operate the compressor, corresponds to the consumed power (kW). Further, Q means a capacity to freeze a load fluid, and a higher Q means that more works can be done in the same system. In other words, it means that with a working fluid having a higher Q, the desired performance can be obtained with a smaller amount, whereby the system can be downsized.

In operation of the heat cycle system, in order to avoid drawbacks due to inclusion of moisture or inclusion of non-condensing gas such as oxygen, it is preferred to provide a means to prevent such inclusion.

If moisture is included in the heat cycle system, a problem may arise particularly when used at low temperature. For example, a problem such as freezing in a capillary tube, hydrolysis of the working fluid or the lubricant oil, deterioration of materials by an acid component formed by the hydrolysis, or formation of contaminants, may arise. Particularly in a case where the lubricating oil is a polyalkylene glycol oil or polyol ester oil, it has extremely high moisture absorbing properties and is likely to undergo hydrolysis, and inclusion of moisture decreases properties of the lubricating oil and may be a great cause to impair the long term reliability of a compressor. Accordingly, in order to suppress hydrolysis of the lubricating oil, it is necessary to control the moisture concentration in the heat cycle system.

As a method of controlling the moisture concentration in the heat cycle system, a method of using a moisture-removing means such as a desiccant (such as silica gel, activated aluminum or zeolite) may be mentioned. The desiccant is preferably brought into contact with the working fluid in a liquid state or a working fluid composition comprising it, in view of the dehydration efficiency. For example, the desiccant is preferably located at the outlet of the condenser or at the inlet of the evaporator to be brought into contact with the working fluid or the working fluid composition comprising it.

The desiccating agent is preferably a zeolite desiccating agent in view of chemical reactivity of the desiccating agent and the working fluid or the working fluid composition comprising it, and the moisture absorption capacity of the desiccating agent.

The zeolite desiccating agent is, in a case where a lubricating oil having a large moisture absorption as compared with a conventional mineral lubricating oil is used, preferably a zeolite desiccating agent containing a compound represented by the following formula (C) as the main component in view of excellent moisture absorption capacity.

$$M_{2/n}O \cdot Al_2O_3 \cdot xSiO_2 \cdot yH_2O \tag{C}$$

wherein M is a group 1 element such as Na or K or a group 2 element such as Ca, n is the valence of M, and x and y are values determined by the crystal structure. The pore size can be adjusted by changing M.

To select the desiccating agent, the pore size and the fracture strength are important. In a case where a desiccating agent having a pore size larger than the molecular sizes of components contained in the working fluid or the working fluid composition comprising it (hereinafter referred to as "working fluid or the like") is used, the working fluid or the like is adsorbed in the desiccating agent and as a result, chemical reaction between the working fluid or the like and the desiccating agent will occur, thus leading to undesired phenomena such as formation of non-condensing gas, a decrease in the strength of the desiccating agent, and a decrease in the adsorption capacity.

Accordingly, it is preferred to use as the desiccating agent a zeolite desiccating agent having a small pore size. Particularly preferred is sodium/potassium type A synthetic zeolite having a pore size of at most 3.5 Å. By using a sodium/potassium type A synthetic zeolite having a pore size smaller than the molecular size of the working fluid of the like, it is possible to selectively adsorb and remove only moisture in the heat cycle system without adsorbing the working fluid of the like. In other words, the working fluid of the like is less likely to be adsorbed in the desiccating agent, whereby heat decomposition is less likely to occur and as a result, deterioration of materials constituting the heat cycle system and formation of contaminants can be suppressed.

The size of the zeolite desiccating agent is preferably from about 0.5 to about 5 mm as a representative value of the particle size, since if it is too small, a valve or a thin portion in pipelines of the heat cycle system may be clogged, and if it is too large, the drying capacity will be decreased. Its shape is preferably granular or cylindrical.

The zeolite desiccating agent may be formed into an optional shape by solidifying powdery zeolite by a binding agent (such as bentonite). So long as the desiccating agent is composed mainly of the zeolite desiccating agent, other desiccating agent (such as silica gel or activated alumina) may be used in combination.

Further, if non-condensing gas is included in the heat cycle system, it has adverse effects such as heat transfer failure in the condenser or the evaporator and an increase in the working pressure, and it is necessary to suppress its inclusion as far as possible. Particularly, oxygen which is one of non-condensing gases reacts with the working fluid or the lubricating oil and promotes their decomposition.

The non-condensing gas concentration is, in a vapor phase portion of the working fluid, preferably at most 1.5 vol %, particularly preferably at most 0.5 vol % by the volume ratio based on the working fluid.

The above-described heat cycle system, which employs the working fluid for heat cycle of the present invention being excellent in the cycle performance and having a small composition change and a small temperature glide, can be downsized. Further, the heat cycle system is excellent in the cycle performance with a light environmental burden, since it employs the working fluid for heat cycle of the present invention.

EXAMPLES

Now, the present invention will be described in further detail with reference to Examples. However, it should be understood that the present invention is by no means restricted to such specific Examples.

Ex. 1 to 11

An azeotrope-like composition consisting of 1224yd(Z) and 1233zd(E) in a ratio as identified in Table 4 was prepared and taken as a working fluid for heat cycle in each of Ex. 1 to 11. Of the working fluid for heat cycle in each Ex., the cycle performance and the temperature glide were evaluated as follows.
(Evaluation of Refrigerating Cycle Performance and Temperature Glide)

The refrigerating cycle performance (refrigerating capacity and coefficient of performance) and the temperature glide were evaluated as the cycle performance (capacity and efficiency) in a case where the working fluid for heat cycle in each Ex. was applied to a refrigerating cycle system 10 shown in FIG. 2, and a heat cycle as shown in FIG. 3, that is, adiabatic compression by a compressor 11 in the AB process, isobaric cooling by a condenser 12 in the BC process, isenthalpic expansion by an expansion valve 13 in the CD process, isobaric heating in an evaporator 14 in the DA process, were carried out.

The evaluation was conducted under the temperature conditions such that the average evaporation temperature of the working fluid for heat cycle in the evaporator 14 was 5° C., the average condensing temperature of the working fluid for heat cycle in the condenser 12 was 40° C., the supercooling degree of the working fluid for heat cycle in the condenser 12 was 5° C., the degree of superheat of the working fluid for heat cycle in the evaporator 14 was 0° C., and the compressor efficiency was 0.8. Further, it was assumed that there was no loss in the equipment efficiency and no pressure loss in the pipelines and heat exchanger.

The refrigerating capacity and the coefficient of performance were obtained in accordance with the above formulae (1) and (2) from enthalpies h in the respective states of the working fluid for heat cycle, i.e. A (after evaporation, high temperature and low pressure), B (after compression, high temperature and high pressure), C (after condensation, low temperature and high pressure) and D (after expansion, low temperature and low pressure). The temperature glide was obtained as a difference between $T_1$ and $T_2$.

The thermodynamic properties required for calculation of the refrigerating cycle performance were calculated based on the generalized equation of state (Soave-Redlich-Kwong equation) based on the law of corresponding state and various thermodynamic equations. If a characteristic value was not available, it was calculated employing an estimation technique based on a group contribution method.

The relative performance (working fluid in each Ex./ 1233zd(E)) of the refrigerating cycle performance (refrigerating capacity and coefficient of performance) of the working fluid in each Ex. based on the refrigerating cycle performance (refrigerating capacity and coefficient of performance) of a working fluid consisting of 1233zd(E) measured in the same manner (1.00), was obtained. The results are shown in Table 4 together with the compositions of the working fluids for heat cycle.

TABLE 4

| | Working fluid composition [mass %] | | Temperature | Relative value (based on 1233zd(E)) | |
|---|---|---|---|---|---|
| Ex. | 1224yd(Z) | 1233zd(E) | glide [° C.] | Refrigerating capacity | Coefficient of performance |
| 1 | 95 | 5 | 0.0 | 1.14 | 0.99 |
| 2 | 90 | 10 | 0.0 | 1.14 | 0.99 |
| 3 | 80 | 20 | 0.0 | 1.14 | 0.99 |
| 4 | 70 | 30 | 0.0 | 1.14 | 0.99 |
| 5 | 60 | 40 | 0.0 | 1.13 | 0.99 |
| 6 | 50 | 50 | 0.2 | 1.12 | 0.99 |
| 7 | 40 | 60 | 0.2 | 1.10 | 0.99 |
| 8 | 30 | 70 | 0.4 | 1.08 | 1.00 |
| 9 | 20 | 80 | 0.4 | 1.06 | 1.00 |
| 10 | 10 | 90 | 0.2 | 1.03 | 1.00 |
| 11 | 5 | 95 | 0.2 | 1.01 | 1.00 |

It was found from the results in Table that the working fluid for heat cycle comprising an azeotrope-like composition consisting of 1224yd and 1233zd(E) has a small temperature glide. Further, such a working fluid is found to have a refrigerating capacity improved as compared with a working fluid consisting of 1233zd(E).

The working fluid for heat cycle of the present invention is useful as a working fluid such as a refrigerant for a refrigerating apparatus, a refrigerant for an air-conditioning apparatus, a working fluid for a power generation system (such as exhaust heat recovery power generation), a working fluid for a latent heat transport apparatus (such as a heat pipe) or a secondary cooling fluid.

This application is a continuation of PCT Application No. PCT/JP2018/027907, filed on Jul. 25, 2018, which is based upon and claims the benefit of priority from Japanese Patent Application No. 2017-144773 filed on Jul. 26, 2017. The contents of those applications are incorporated herein by reference in their entireties.

REFERENCE SYMBOLS

10: refrigerating cycle system, 11: compressor, 12: condenser, 13: expansion valve, 14: evaporator, 15, 16: pump, A, B: working fluid vapor, C, D: working fluid, E, E': load fluid, F: fluid

What is claimed is:

1. An azeotropic or azeotrope-like composition consisting of 1-chloro-2,3,3,3-tetrafluoropropene and (E)-1-chloro-3,3,3-trifluoropropene,
   wherein the content ratio of 1-chloro-2,3,3,3-tetrafluoropropene to (E)-1-chloro-3,3,3-trifluoropropene is from about (80 or more:20 or less) to about (85 or less:15 or more) by the mass ratio represented by 1-chloro-2,3,3,3-tetrafluoropropene:(E)-1-chloro-3,3,3-trifluoropropene.

2. The azeotropic composition according to of claim 1, wherein the content ratio of 1-chloro-2,3,3,3-tetrafluoropropene to (E)-1-chloro-3,3,3-trifluoropropene is 85:15 by the mass ratio represented by 1-chloro-2,3,3,3-tetrafluoropropene:(E)-1-chloro-3,3,3-trifluoropropene.

3. A working fluid, comprising the azeotropic azeotrope-like composition of claim 1.

4. The working fluid of claim 3, wherein the content of the azeotropic or azeotrope-like composition is at least 80 mass % based on the entire amount of the working fluid.

5. The working fluid claim 3, wherein the content of 1-chloro-2,3,3,3-tetrafluoropropene is at least 40 mass % based on the entire amount of the working fluid.

6. A heat cycle system, employing the working fluid of claim 3.

7. The heat cycle system of claim 6, which is a refrigerating apparatus, an air-conditioning apparatus, a power generation system, a heat transport apparatus or a secondary cooling machine.

8. The heat cycle system of claim 6, which is a centrifugal refrigerator.

9. The heat cycle system of claim 6, which is a low pressure centrifugal refrigerator.

* * * * *